US012726715B2

(12) United States Patent
Chang et al.

(10) Patent No.: US 12,726,715 B2
(45) Date of Patent: Sep. 1, 2026

(54) HDR FUSION FOR VARIABLE APERTURE DEVICES TO MAINTAIN SPOTLIGHT VISUAL ARTIFACTS

(71) Applicant: QUALCOMM Incorporated, San Diego, CA (US)

(72) Inventors: Wei-Te Chang, Taipei City (TW); Yi-Han Liao, Taipei City (TW); Lijun Zhang, Shanghai (CN); Wei-Chih Liu, Taipei City (TW); Wen-Chun Feng, New Taipei City (TW)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 19/115,154

(22) PCT Filed: Dec. 8, 2022

(86) PCT No.: PCT/CN2022/137452

§ 371 (c)(1),
(2) Date: Mar. 25, 2025

(87) PCT Pub. No.: WO2024/119428

PCT Pub. Date: Jun. 13, 2024

(65) Prior Publication Data

US 2026/0095674 A1 Apr. 2, 2026

(51) Int. Cl.
*H04N 5/335* (2011.01)
*H04N 23/71* (2023.01)
(Continued)

(52) U.S. Cl.
CPC .......... *H04N 23/741* (2023.01); *H04N 23/71* (2023.01); *H04N 23/76* (2023.01)

(58) Field of Classification Search
CPC .................................................... H04N 23/71
See application file for complete search history.

(56) References Cited

U.S. PATENT DOCUMENTS

2015/0030247 A1* 1/2015 Shu .......................... G06T 5/77 382/167
2017/0293259 A1 10/2017 Ochiai et al.
(Continued)

FOREIGN PATENT DOCUMENTS

WO 2017165860 A1 9/2017

OTHER PUBLICATIONS

International Search Report and Written Opinion—PCT/CN2022/137452—ISA/EPO—Aug. 14, 2023 (2208557WO1).

*Primary Examiner* — Gary C Vieaux
(74) *Attorney, Agent, or Firm* — Norton Rose Fulbright US LLP/QUALCOMM Incorporated

(57) ABSTRACT

This disclosure provides systems, methods, and devices for image signal processing that support blending images. In a first aspect, a computing device may receive a first image frame and a second image frame. The second image frame may be captured with a smaller aperture than the first image frame. The computing device may determine that a spotlight is depicted within the first image frame and determine, based on the spotlight within the first image frame, a blending mask for the first image frame and the second image frame. A third image frame may be determined that blends the first image frame and the second image frame according to the blending mask to include at least one visual artifact caused by the spotlight within the second image frame. Other aspects and features are also claimed and described.

20 Claims, 6 Drawing Sheets

(51) Int. Cl.
*H04N 23/741* (2023.01)
*H04N 23/76* (2023.01)

(56) References Cited

U.S. PATENT DOCUMENTS

| | | | |
|---|---|---|---|
| 2019/0356873 | A1 | 11/2019 | Douady-Pleven et al. |
| 2019/0373167 | A1* | 12/2019 | Liu ........................ H04N 23/63 |
| 2020/0259999 | A1 | 8/2020 | Adams et al. |
| 2022/0060619 | A1 | 2/2022 | Pinhasov et al. |
| 2022/0264076 | A1 | 8/2022 | Makinen |
| 2022/0360718 | A1 | 11/2022 | Choffat et al. |

* cited by examiner

HDR FUSION FOR VARIABLE APERTURE DEVICES TO MAINTAIN SPOTLIGHT VISUAL ARTIFACTS

CROSS-REFERENCE TO RELATED APPLICATION

This application is a 371 National Stage of PCT Application No. PCT/CN2022/137452, filed on Dec. 8, 2022, entitled "HDR FUSION FOR VARIABLE APERTURE DEVICES TO MAINTAIN SPOTLIGHT VISUAL ARTIFACTS", and assigned to the assignee hereof. The disclosure of the prior Application is considered part of and is incorporated by reference into this Patent Application.

TECHNICAL FIELD

Aspects of the present disclosure relate generally to image processing, and more particularly, to dynamically control variable apertures in HDR fusion. Some features may enable and provide improved image processing, including spotlight detection and exposure control in multi-frame fusion.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

In certain scenes, a photographer may desire to direct the viewer's focus to one portion of the scene. For example, in a portrait photograph of a person, the photographer may desire for the viewer to focus on the person, rather than other scenery. The photographer may choose a low aperture lens for such a photograph, because the low aperture results in objects at different depths than the person to be significantly blurred. Lower aperture lenses produce higher blurring than higher aperture lenses. However, lower aperture lenses generally are larger in size and made from higher-cost materials.

Dynamic range may be important to image quality when capturing a representation of a scene with a wide color gamut using an image capture device. Conventional image sensors have a limited dynamic range, which may be smaller than the dynamic range of human eyes. Dynamic range may refer to the light range between bright portions of an image and dark portions of an image. A conventional image sensor may increase an exposure time to improve detail in dark portions of an image at the expense of saturating bright portions of an image. Alternatively, a conventional image sensor may decrease an exposure time to improve detail in bright portions of an image at the expense of losing detail in dark portions of the image. Thus, image capture devices conventionally balance conflicting desires, preserving detail in bright portions or dark portions of an image, by adjusting exposure time. High dynamic range (HDR) photography improves photography using these conventional image sensors by combining multiple recorded representations of a scene from the image sensor.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, the techniques described herein relate to an apparatus, including a memory storing processor-readable code; and at least one processor coupled to the memory. The at least one processor may be configured to execute the processor-readable code to cause the at least one processor to perform operations including: receiving a first image frame and a second image frame, wherein the first image frame is captured with a first aperture size and the second image frame is captured with a second aperture size smaller than the first aperture size; determining that a spotlight is depicted within the first image frame; determining, based on the spotlight within the first image frame, a blending mask for the first image frame and the second image frame; and determining a third image frame that blends the first image frame and the second image frame according to the blending mask, wherein the third image frame is blended to include at least one visual artifact caused by the spotlight within the second image frame.

In some aspects, the techniques described herein relate to a method, including receiving a first image frame and a second image frame, wherein the first image frame is captured with a first aperture size and the second image frame is captured with a second aperture size smaller than the first aperture size; determining that a spotlight is depicted within the first image frame; determining, based on the spotlight within the first image frame, a blending mask for the first image frame and the second image frame; and determining a third image frame that blends the first image frame and the second image frame according to the blending mask, wherein the third image frame is blended to include at least one visual artifact caused by the spotlight within the second image frame.

In some aspects, the techniques described herein relate to an image capture device, including an image sensor; a memory storing processor-readable code; and at least one processor coupled to the memory and to the image sensor. The at least one processor may be configured to execute the processor-readable code to cause the at least one processor to: receive a first image frame and a second image frame, wherein the first image frame is captured with a large aperture and the second image frame is captured with a small aperture; determine that a spotlight is depicted within the first image frame; determine, based on the spotlight within the first image frame, a blending mask for the first image frame and the second image frame; and determine a third image frame that blends the first image frame and the second image frame according to the blending mask, wherein the third image frame is blended to include at least one visual artifact caused by the spotlight within the second image frame.

In some aspects, the techniques described herein relate to a non-transitory computer-readable medium storing instructions that, when executed by a processor, cause the processor to perform operations including receiving a first image frame and a second image frame, wherein the first image frame is captured with a large aperture and the second image frame is captured with a small aperture; determining that a spotlight is depicted within the first image frame; determining, based on the spotlight within the first image frame, a blending mask for the first image frame and the second image frame; and determining a third image frame that blends the first image frame and the second image frame according to the blending mask, wherein the third image frame is blended to include at least one visual artifact caused by the spotlight within the second image frame.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame 404 and a second image frame 406 are captured using different exposure times, different apertures, different lenses, and/or other characteristics that may result in improved dynamic range of a fused image when the two image frames are combined. In some aspects, the method may be performed for MFNR photography in which the first image frame 404 and a second image frame 406 are captured using the same or different exposure times and fused to generate a corrected first image frame 404 with reduced noise compared to the captured first image frame 404.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frame 406*s* input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

In certain implementations, variable aperture image sensors may be to capture one or more image frames for HDR images. In particular, using variable aperture devices may enable additional levels of control for image frames captured for fusion or blending into a single HDR image. In particular, rather than only being able to adjust brightness or gain levels and exposure time, variable aperture devices may be able to use larger apertures to capture image frames in low light conditions with reduced noise levels, improving image quality for the resulting hardware images.

Figure 3:
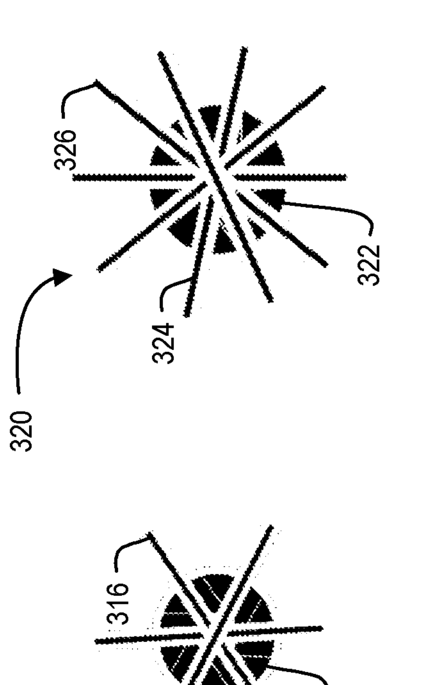
FIG. 3 depicts example aperture settings according to an exemplary embodiment of the present disclosure.
Figure 3:
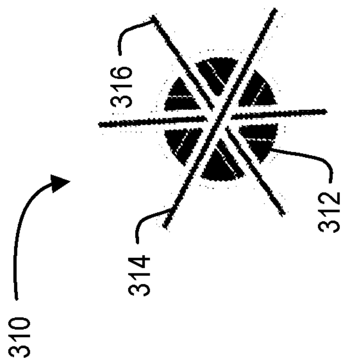
Figure 3:
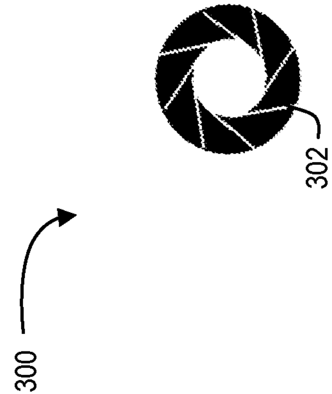
Figure 3:

However, smaller aperture settings may result in particular types of visual artifacts, which may be desirable in certain instances. In particular, the aperture of an image sensor may cause visual artifacts within images or image frames captured by the image sensor with smaller aperture settings. For example, so called "starburst" artifacts may be caused by the diffraction of light with the blades in the aperture. (such as blades within the aperture of a variable aperture image sensor). In particular, FIG. 3 depicts example aperture settings 300, 310 according to an exemplary embodiment of the present disclosure. The aperture settings 300, 310 include apertures 302, 312 set to different sizes. For example, the aperture 302 may be set to an aperture of f/1.7, while the aperture 312 may be set to an aperture of f/2.1. The aperture 302 is a relatively large aperture setting, so minimal diffraction happens for point light sources within captured images. By contrast, the aperture 312 is a relatively small setting, resulting in diffraction from point light sources, which creates visual artifacts 314, 316 that form a star shape. Starburst artifacts such as these may be desirable for certain applications or may be preferred by certain individuals (such as for esthetic reasons).

As noted above, larger aperture settings may be desirable for improved HDR performance in low light settings. However, such aperture settings are not able to capture desirable visual artifacts from point light sources within captured images, which may reduce the aesthetic value of images captured with these aperture settings. Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

One solution to this problem may be to capture multiple image frames with multiple aperture settings, including at least a first image frame captured with a large aperture setting and a second image frame captured with a small aperture setting. A spotlight may be detected within the first image frame, and a blending mask for the first image frame and second image frame may be determined based on the detected spotlight. In particular, the blending mask may be generated to blend portions of the second image frame with portions of the first image frame at locations containing spotlights. A third image frame may accordingly be determined that blends the first and second image frames according to the blending mask. In particular, the third image frame may include one or more visual artifacts present within the second image frame (such as starburst visual artifacts caused by the smaller aperture setting for the second image frame). However, the third image frame may still maintain the improved image characteristics (such as improved brightness or noise values) enabled by the larger aperture setting used for the first image frame.

An example device for capturing image frames using one or more image sensors, such as a smartphone, may include a configuration of one, two, three, four, or more cameras on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames in a memory and/or otherwise provide the output image frames to processing circuitry (such as through a bus). The processing circuitry may perform further processing, such as for encoding, storage, transmission, or other manipulation of the output image frames.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and Aspects of the present disclosure are applicable to any electronic device including, coupled to, or otherwise processing data from one, two, or more image sensors capable of capturing image frames (or "frames"). The terms "output image frame" and "corrected image frame" may refer to image frames that have been processed by any of the discussed techniques. Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," " "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

Figure 1:
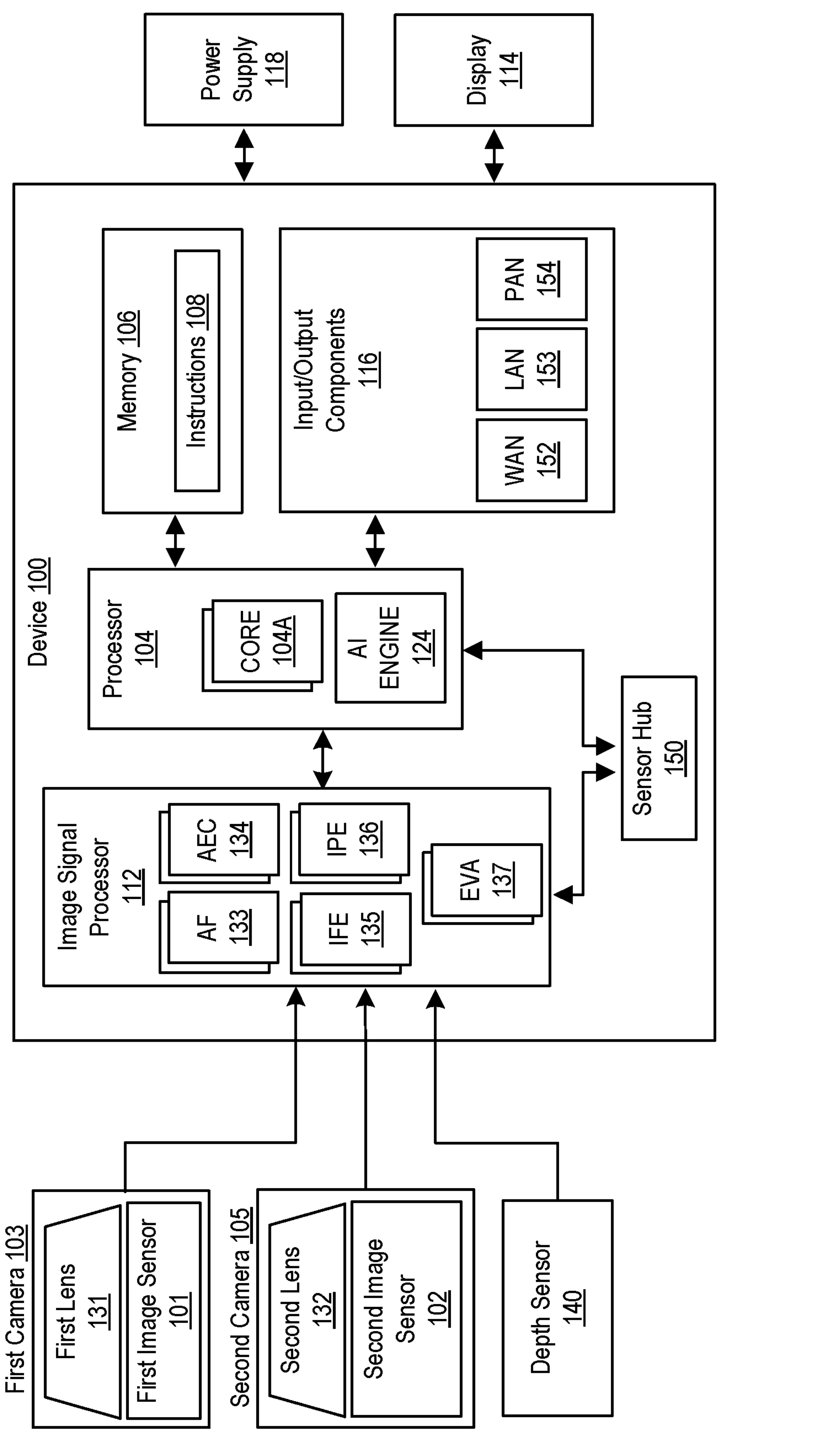
FIG. 1 shows a block diagram of an example device for performing image capture from one or more image sensors.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons.

I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands.

The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and/or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first camera 103 and second camera 105, respectively. In another embodiment, a wire interface couples the image signal processor 112 to an external image sensor. In a further embodiment, a wireless interface couples the image signal processor 112 to the image sensor 101, 102.

The first camera 103 may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The camera 103 may be a variable aperture (VA) camera in which the aperture can be controlled to a particular size. Example aperture sizes are f/2.0, f/2.8, f/3.2, f/8.0, etc. Larger aperture values correspond to smaller aperture sizes, and smaller aperture values correspond to larger aperture sizes. The camera 103 may have different characteristics based on the current aperture size, such as a different depth of focus (DOF) at different aperture sizes.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112, and output from the depth sensors are processed in a similar manner to that of image sensors 101 and 102. Example depth sensors include active sensors, including one or more of indirect Time of Flight (iToF), direct Time of Flight (dToF), light detection and ranging (Lidar), mmWave, radio detection and ranging (Radar), and/or hybrid depth sensors, such as structured light. In embodiments without a depth sensor 140, similar information regarding depth of objects or a depth map may be generated in a passive manner from the disparity between two image sensors (e.g., using depth-from-disparity or depth-from-stereo), phase detection auto-focus (PDAF) sensors, or the like. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more auto exposure compensation (AEC) 134 engines, and/or one or more engines for video analytics (EVAs). The AF 133, AEC 134, IFE 135, IPE 136, and EVA 137 may each include application-specific circuitry, be embodied as software code executed by the ISP 112, and/or a combination of hardware and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system-on-chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including dynamic range and visual artifact operations. For example, execution of the instructions can instruct the image signal processor 112 to begin or end capturing an image frame or a sequence of image frames, in which the capture includes image frames with different aperture settings as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, a camera application executing on processor 104 may receive a user command to begin a video preview display upon which a video comprising a sequence of image frames is captured and processed from one or more image sensors 101 or 102 through the image signal processor 112. Image processing to generate "output" or "corrected" image frames, such as according to techniques described herein, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124 or other co-processor) to offload certain tasks from the cores 104A. The AI engine 124 may be used to offload tasks related to, for example, face detection and/or object recognition. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images by blending image frames that are captured with different aperture settings. One example method of operating one or more cameras, such as camera 103, is shown in FIG. 2 and described below.

Figure 2:
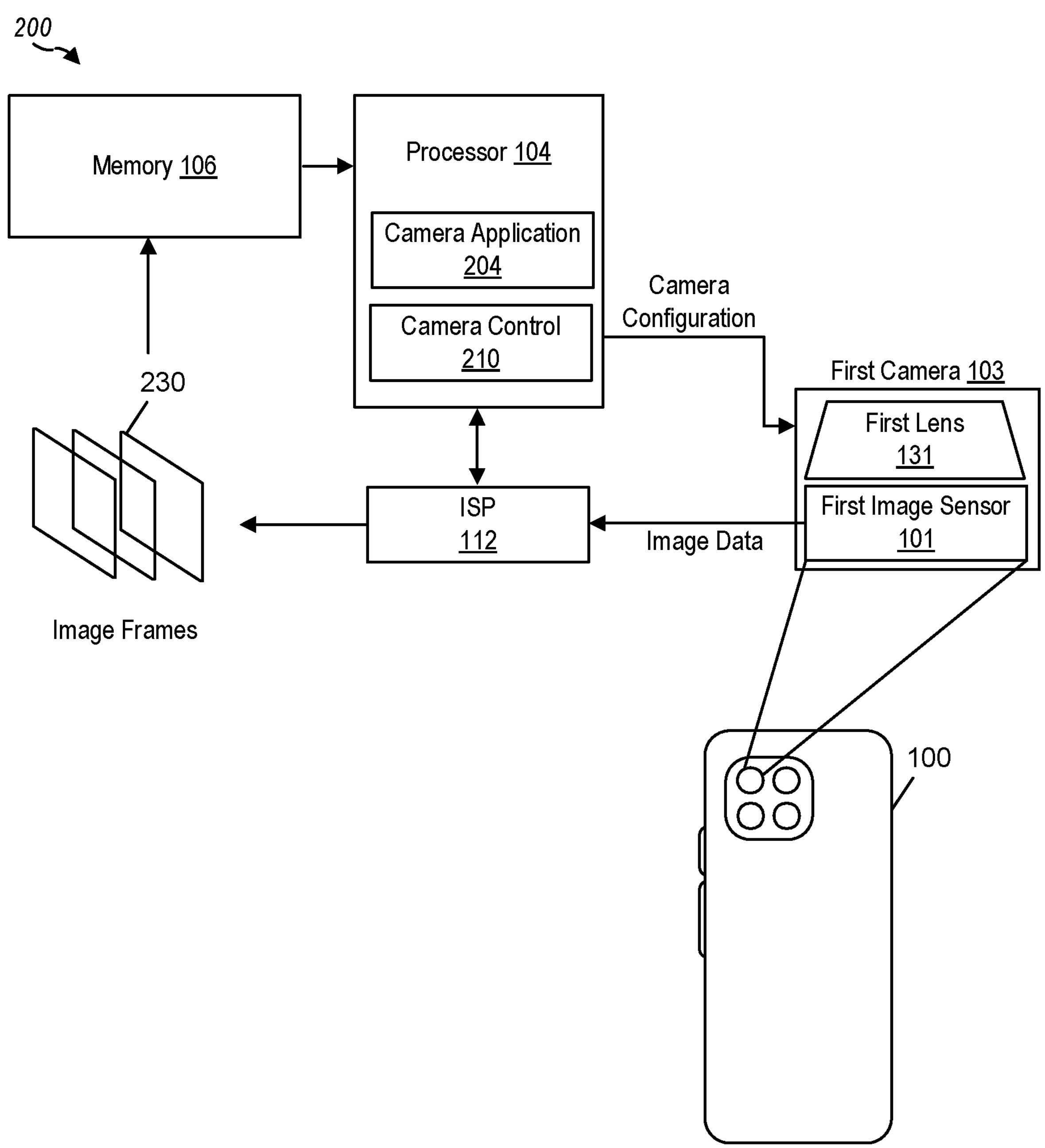
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosure. A processor 104 of system 200 may communicate with image signal processor (ISP) 112 through a bi-directional bus and/or separate control and data lines. The processor 104 may control camera 103 through camera control 210, such as for configuring the camera 103 through a driver executing on the processor 104. The camera control 210 may be managed by a camera application 204 executing on the processor 104, which provides settings accessible to a user such that a user can specify individual camera settings or select a profile with corresponding camera settings. The camera control 210 communicates with the camera 103 to configure the camera 103 in accordance with commands received from the camera application 204. The camera application 204 may be, for example, a photography application, a document scanning application, a messaging application, or other application that processes image data acquired from camera 103.

The camera configuration may parameters that specify, for example, a frame rate, an image resolution, a readout duration, an exposure level, an aspect ratio, an aperture size, etc. The camera 103 may obtain image data based on the camera configuration. For example, the processor 104 may execute a camera application 204 to instruct camera 103, through camera control 210, to set a first camera configuration for the camera 103, to obtain first image data from the camera 103 operating in the first camera configuration, to instruct camera 103 to set a second camera configuration for the camera 103, and to obtain second image data from the camera 103 operating in the second camera configuration.

In some embodiments in which camera 103 is a variable aperture (VA) camera system, the processor 104 may execute a camera application 204 to instruct camera 103 to configure to a first aperture size, obtain first image data from the camera 103, instruct camera 103 to configure to a second aperture size, and obtain second image data from the camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 is a larger aperture size than f/8.0. In certain implementations, exposure and aperture settings for the camera may be controlled by an automated exposure controller (AEC).

The image data received from camera 103 may be processed in one or more blocks of the ISP 112 to form image frames 230 that are stored in memory 106 and/or provided to the processor 104. The processor 104 may further process the image data to apply effects to the image frames 230. Effects may include Bokeh, lighting, color casting, and/or high dynamic range (HDR) merging. In some embodiments, functionality may be embedded in a different component, such as the ISP 112, a DSP, an ASIC, or other custom logic circuit for performing the additional image processing.

Figure 4:
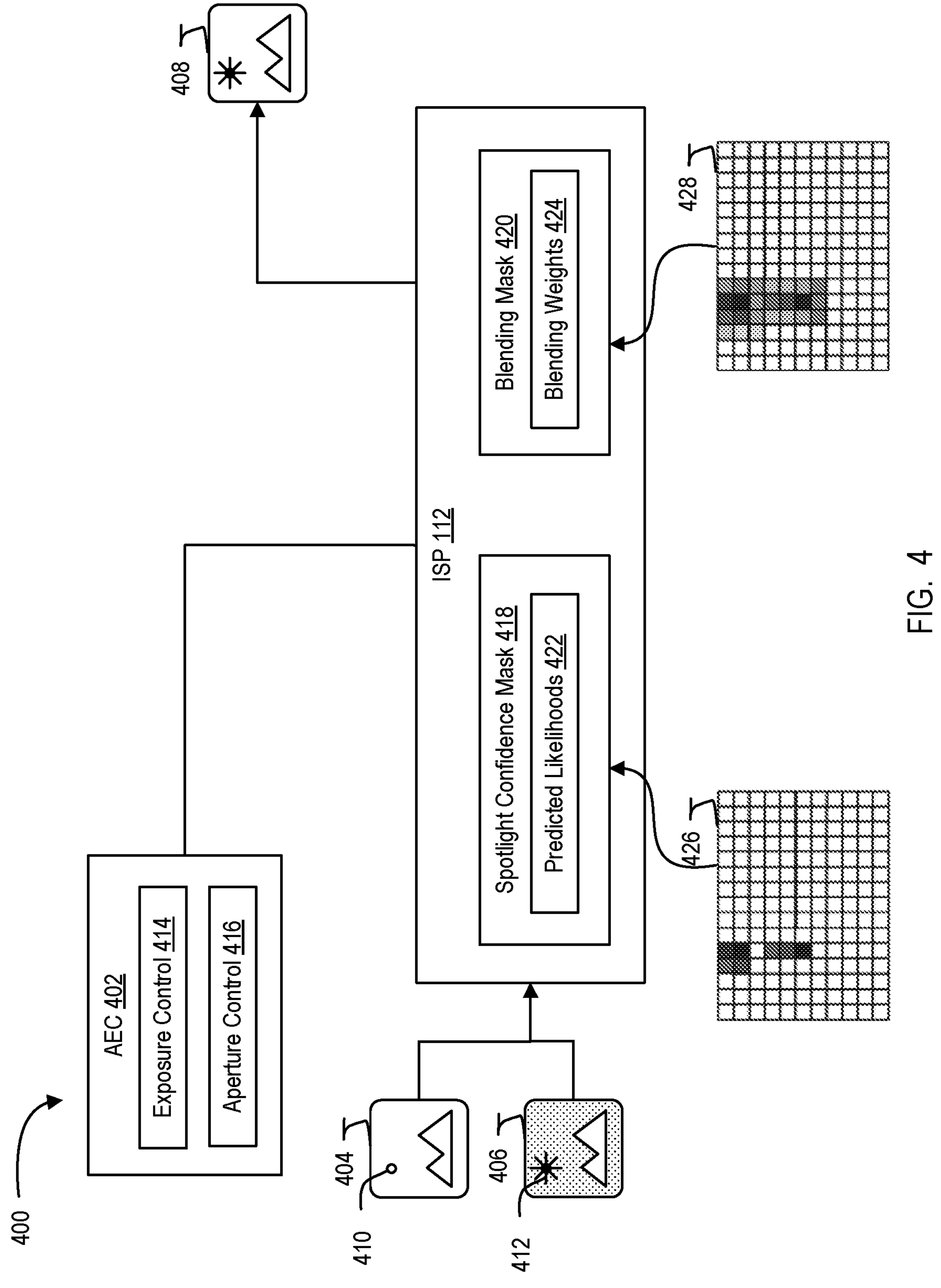
FIG. 4 depicts a system for blending image frames to preserve visual artifacts according to an exemplary embodiment of the present disclosure.

For example, FIG. 4 depicts a system 400 for blending image frames to preserve visual artifacts according to an exemplary embodiment of the present disclosure. In particular, the system 400 may be an exemplary application of one or both of the systems 100, 200. The system 400 includes image frames 404, 406, 408, an automated exposure controller (AEC) 402, and an ISP 112. The ISP 112 includes a spotlight confidence mask 418, a blending mask 420. The spotlight confidence mask 418 includes a predicted likelihood 422. The blending mask 420 includes a blending weights 424.

In particular, the ISP 112 may be configured to receive a first image frame 404 and a second image frame 406 and to generate an output image frame 408 based on the first and second image frames 404, 406. The first and second image frames 404, 406 may be captured by an image sensor, such as a variable aperture image sensor. In particular, the AEC 402 Includes an exposure control 414 and an aperture control 416 that may be used to control operation of the image sensor to capture image frames 404, 406. In particular, the exposure control 414 may control one or more exposure settings (such as exposure time and gain). The aperture control 416 may control and aperture setting for the image sensor.

The ISP 112 may be configured to receive a first image frame 404 and a second image frame 406, the first image frame 404 may be captured with a large aperture and the second image frame 406 may be captured with a small aperture. In certain implementations, a large aperture may have an f-stop of f/2.0 or less (such as f/1.8) and a small aperture may have an f-stop greater than f/2.0 (such as f/2.8, f/3.5, and the like). In certain implementations, the first image frame 404 and second image frame 406 are captured by the same image sensor utilizing different aperture settings, such as aperture settings controlled by the AEC 402.

The ISP 112 may be configured to determine whether spotlight 410 is depicted within the first image frame 404. In certain implementations, the spotlight 410 may represent a source of light (such as a point source of light) with a brightness high enough to cause a visual artifact (such as a starburst artifact) in image frames captured with a small aperture. For example, the spotlight 410 in the first image frame 404 has caused a visual artifact 412 in the second image frame 406, which is captured with a small aperture setting. In certain instances, the spotlight 410 may be detected only for particular types of light sources, such as point sources of light, circular sources of light, semicircular sources of light, and combinations thereof. In still further implementations, spotlights may be defined according to one or more predefined criteria.

For example, determining whether a spotlight 410 is depicted within the first image frame 404 may include determining whether a brightness value for a collection of pixels within the first image frame 404 exceeds a first predetermined threshold. For example, the ISP 112 may identify pixels within the first image frame 404 for pixels with brightness values that exceed the first predetermined threshold. In certain implementations, the first predetermined threshold may be determined based on a maximum brightness value (such as a maximum possible brightness value, a maximum brightness value within the image frame 304, or combinations thereof). In one specific example, the first predetermined value may be 95% of the maximum brightness. In still further implementations, the first threshold may change based on different scenes or lighting conditions. Pixels whose brightness values exceed the first predetermined threshold may then be identified as potential spotlight locations.

Determining whether a spotlight 410 is depicted within the first image frame 404 may further include determining whether a size of the collection of pixels may be within a first predetermined range. For example, clusters or collections of pixels with brightness values that exceed the first predetermined threshold may be identified. An image morphology process, such as a closing operator, may be applied to determine whether a border can be connected surrounding the clusters or collections of pixels. A number of pixels within each cluster or collection may then be compared to a predetermined range to confirm that the potential spotlight is not too large or too small to cause a desired visual artifact, such as a starburst artifact. For example, the predetermined range may be a 9 pixel×9 pixel rectangular range. In certain implementations, the predetermined range may be dynamically changed based on different scenes or lighting conditions. If the number of pixels in an identified cluster or collection is within the predetermined range, the cluster or collection may be identified as a potential spotlight. If the number of pixels in an identified cluster or collection is not within the predetermined range, the cluster or collection may be excluded as a potential spotlight.

Determining whether a spotlight 410 is depicted within the first image frame 404 may further include determining whether the collection of pixels is circular in shape. In certain implementations, light sources that are circular may include light sources that form a full circular shape within the first image frame 404, a portion of a circular shape, and combinations thereof. Portions of a circular shape may include a semi-circle, quarter circle, and the like. To determine whether a collection of pixels is circular in shape, the ISP 112 may perform a circle transformation on the collection of pixels, such as a Circle Hough Transform. If the transform identifies a circle corresponding to the collection of pixels, it may be determined that the collection of pixels is circular in shape.

Based on one or more of the spotlight detection techniques discussed above, the ISP 112 may determine a spotlight confidence mask 418 that identifies one or more locations of spotlights 410 within the first image frame 404. For example, the spotlight confidence mask 418 may contain predicted likelihoods 422 for one or more corresponding regions of the first image frame 404 that indicate a predicted likelihood that a corresponding region of the first image frame 404 depicts a spotlight 410. For example, FIG. 4 depicts an example mask 426 (that may or may not correspond to the first image frame 404), where darker regions in the mask 426 indicate higher predicted likelihoods that a corresponding portion of the first image frame 404 contains a spotlight 410. In certain implementations, determining the spotlight confidence mask 418 may include using a gaussian filter to determine predicted likelihoods 422 for corresponding portions of the first image frame 404 based on the brightness, size, and shape detection results (such as normalized scores for each of these detection techniques based on one or more thresholds) for the corresponding portions of the first image frame 404. In certain implementations, the gaussian filter may reduce or normalize confidence values to within a predefined range, which may correct for overestimates or underestimates. In certain implementations, determining that the spotlight 410 may be depicted within the first image frame 404 comprises determining that at least one predicted likelihood from the spotlight confidence mask 418 exceeds a second predetermined threshold. In certain implementations, the likelihoods 422 may be normalized to values within 0-1, and the second predetermined threshold may be, for example, 0.6 or greater. In certain implementations, the second predetermined thresholds may be dynamically changed based on different scenes or lighting conditions.

It should be understood that, in certain implementations, one or more of the above-discussed thresholds and ranges may be adjusted in various implementations. For example, one or more of the first predetermined threshold, the second predetermined threshold, the first predetermined range, and combinations thereof may be adjusted or tuned to improve the accuracy of spotlight detection.

In certain implementations, the second image frame 406 may be captured in response to detecting the spotlight 410 within the first image frame 404. For example, the ISP 112 may communicate with the AEC 402 in response to detecting the spotlight 410 within the first image frame 404 and, in response, the AEC 402 may control the image sensor to capture the second image frame 406 with a smaller aperture setting.

The ISP 112 may be configured to determine, based on the spotlight 410 within the first image frame 404, a blending mask 420 for the first image frame 404 and the second image frame 406. In certain implementations, the blending mask 420 may be determined to blend the second image frame 406 with the first image frame 404 in regions that contain the spotlight 410, so as to incorporate one or more visual artifacts 314, 316, 324, 326 caused by the spotlight 410 (such as a starburst visual artifact). For example, the blending mask 420 may be determined based on the spotlight confidence mask 418 such that higher predicted likelihoods 422 within the spotlight confidence mask 418 result in stronger blending weights 424 for corresponding portions of the second image frame 406. Similar to the predicted likelihoods 422, the blending weights 424 may be normalized to have values from 0-1 and may represent a proportion of a blending operation that will apply pixel values from the second image frame 406. In certain implementations, determining the blending mask 420 may include smoothing the spotlight confidence mask 418 to gradually increase blending weights 424 for the second image frame 406. Smoothing the confidence mask to generate the blending mask 420 may include adding one or more regions with low to medium blending weights 424 (such as normalized blending weights of 0.1-0.5) around regions with medium to high blending weights 424 (such as normalized blending weights greater than 0.5) within the blending mask 420. For example, FIG. 4 depicts an example blending mask 428 in which darker regions correspond to higher blending weights for the second image frame 406. As can be seen when comparing the example blending mask 428 to the example spotlight confidence mask 426, the darkest regions of the mask 428 have lower weights than in corresponding portions of the mask 426, and addition regions with low blending weights surround the darkest regions of the mask 428 that were not identified as containing a spotlight in the mask 426. Such smoothing may be necessary because smaller aperture settings require or typically utilize higher gain settings than larger aperture settings to ensure enough brightness is captured. These higher gain settings may result in color imbalances relative to the lower gain setting for image frames captured with larger apertures. Smoothing the blending mask 420 in this way may thus allow for a smoother transition between gain values within a final blending image.

The ISP 112 may be configured to determine a third image frame 408 that blends the first image frame 404 and the second image frame 406 according to the blending mask 420. In particular, the third image frame 408 may be blended to include as least one visual artifact 412 caused by the spotlight 410 within the second image frame 406. For example, the third image frame 408 includes the same visual artifact 412 (not labeled) as the second image frame 406. In certain implementations, corresponding portions of the first and second images may be blended according to blending weights 424 contained within the blending mask 420. In particular, blending may include determining average values or weighted average values for corresponding portions (such as corresponding pixels) within the first image frame 404 and the second image frame 406. In certain implementations, the blending weights 424 within the blending mask 420 may represent a proportion of pixel values from corresponding portions of the second image frame 406 that should be represented in blended pixels within the third image frame 408.

Notably, the second image frame 406 has higher noise values than the first image frame 404 (indicated by stippling in FIG. 4). By blending the first image frame 404 and the second image frame 406 according to the blending mask 420, the ISP 112 is able to generate the third image frame 408 such that the third image frame 408 has both the reduced noise values of the first image frame 404 and the desirable visual artifact 412 from the second image frame 406.

The third image frame 408 may be presented to a user. For example, the third image frame 408 may be presented for display via a smartphone application used to initiate capture of the first and second image frames 404, 406. Additionally, one skilled in the art will appreciate that, in certain implementations, the first image frame 404 may include a plurality of image frames captured with a large aperture, the second image frame 406 may include a plurality of image frames with a small aperture, or both. In certain implementations, the multiple image frames may themselves by blended to form the first/second image frames 404, 406, or may be blended together (such as according to multiple blending masks) to form the third image frame 408.

Figure 5:
FIG. 5 shows a flow chart of an example method for processing image data to capture and combine image frames with different aperture settings according to some embodiments of the disclosure.
Figure 5:
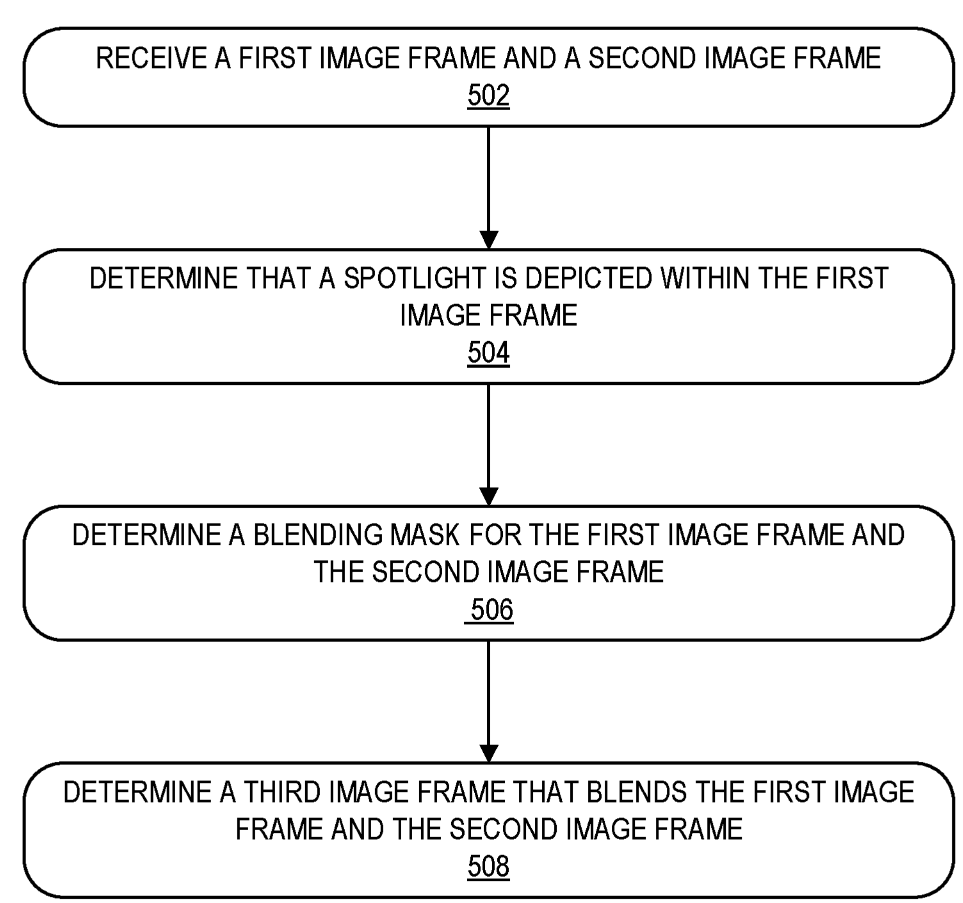

The systems 200, 400 may be configured to perform the operations described with reference to FIG. 5 to determine output image frames 230, 408. FIG. 5 shows a flow chart of an example method 500 for processing image data to capture and combine image frames with different aperture settings according to some embodiments of the disclosure. The capturing in FIG. 5 may obtain an improved digital representation of a scene, which results in a photograph or video with higher image quality (IQ).

The method 500 includes receiving a first image frame and a second image frame (block 502). For example, the ISP 112 may receive a first image frame 404 and a second image frame 406. The first image frame 404 may be captured with a large aperture and the second image frame 406 may be captured with a small aperture.

The method 500 includes determining that a spotlight is depicted within the first image frame (block 504). For example, the ISP 112 may determine that a spotlight 410 is depicted within the first image frame 404. In certain implementations, determining that the spotlight 410 is depicted within the first image frame 404 may include determining that a brightness value for a collection of pixels within the first image exceeds a first predetermined threshold, determining that a size of the collection of pixels is within a first predetermined range, determining that the collection of pixels is circular, and combinations thereof. Based on one or more of these determinations, a spotlight confidence mask 418 may be determined that contains predicted likelihoods 422 that at least a subset of the first image frame 404 contains a spotlight. In such instances, determining that the first image frame 404 depicts a spotlight 410 may include determining that at least one predicted likelihood from the spotlight confidence mask 418 exceeds a second predetermined threshold.

The method 500 includes determining a blending mask for the first image frame and the second image frame (block 506). For example, the ISP 112 may determine, based on the spotlight within the first image frame 404, a blending mask 420 for the first image frame 404 and the second image frame 406. In certain implementations, the blending mask 420 may be determined based on the spotlight confidence mask 418 such that higher predicted likelihoods 422 within the spotlight confidence mask 418 result in stronger blending weights 424 for corresponding portions of the second image frame 406.

The method 500 includes determining a third image frame that blends the first image frame and the second image frame (block 508). For example, the ISP 112 may determine a third image frame 408 that blends the first image frame 404 and the second image frame 406 according to the blending mask 420, as explained further above. In particular, the third image frame 408 may be blended to include as least one visual artifact caused by the spotlight within the second image frame 406.

Figure 6:
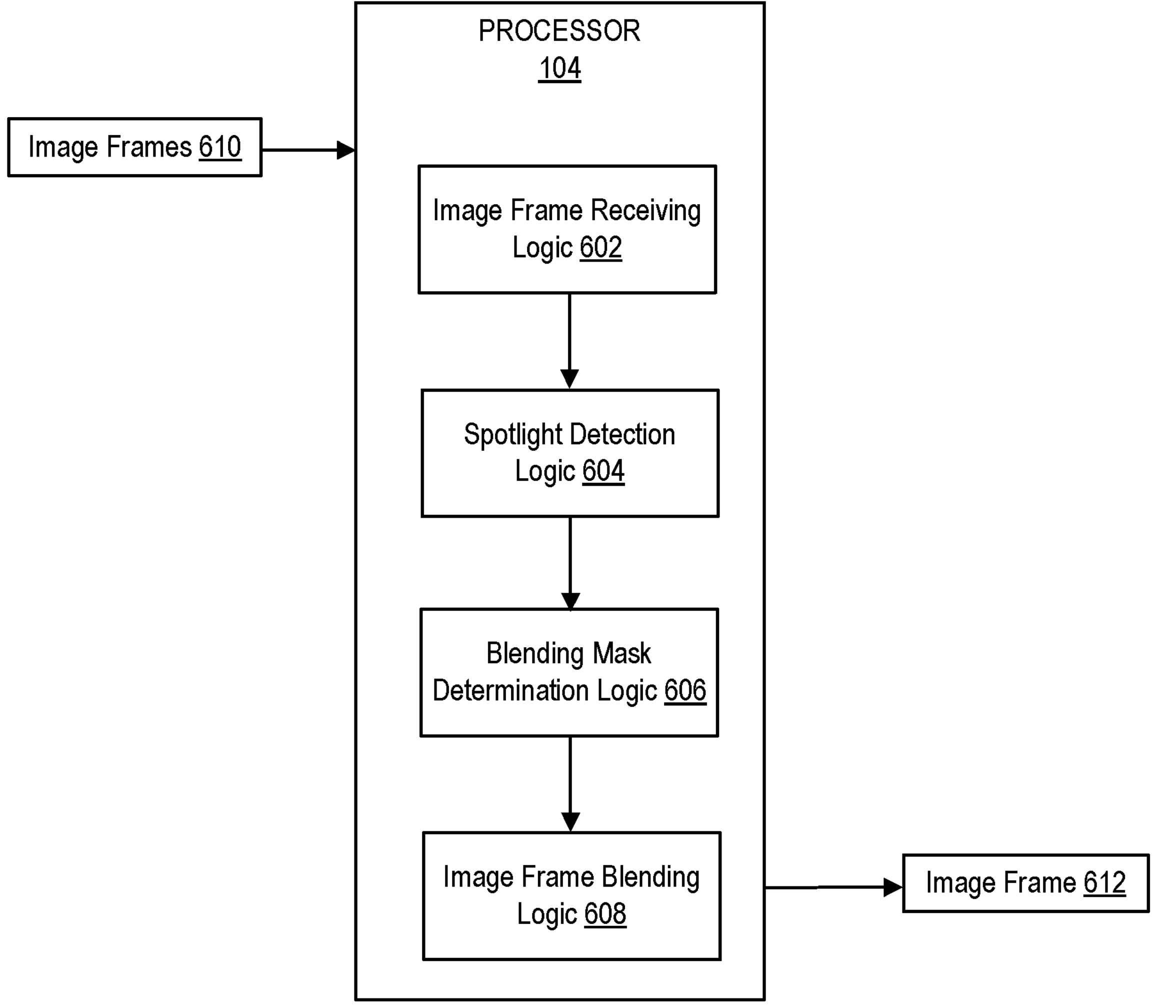
FIG. 6 is a block diagram illustrating an example processor configuration for image data processing in an image capture device according to one or more embodiments of the disclosure.

FIG. 6 is a block diagram illustrating an example processor configuration for image data processing in an image capture device according to one or more embodiments of the disclosure. The processor 104, or other processing circuitry, may be configured to operate on image data to perform one or more operations of the method of FIG. 5. The image data may be processed to determine one or more output image frames 612 based on one or more input image frames 610.

The processor 104 includes image frame receiving logic 602, which may be configured to receive a first image frame and a second image frame. For example, the image frame receiving logic 602 may receive a first image frame 404 and a second image frame 406. The first image frame 404 may be captured with a large aperture and the second image frame 406 may be captured with a small aperture.

The processor 104 includes spotlight detection logic 604, which may be configured to determine that a spotlight is depicted within the first image frame. For example, the spotlight detection logic 604 may determine that a spotlight 410 is depicted within the first image frame 404. In certain implementations, determining that the spotlight 410 is depicted within the first image frame 404 may include determining that a brightness value for a collection of pixels within the first image exceeds a first predetermined threshold, determining that a size of the collection of pixels is within a first predetermined range, determining that the collection of pixels is circular, and combinations thereof. Based on one or more of these determinations, a spotlight confidence mask 418 may be determined that contains predicted likelihoods 422 that at least a subset of the first image frame 404 contains a spotlight. In such instances, determining that the first image frame 404 depicts a spotlight 410 may include determining that at least one predicted likelihood from the spotlight confidence mask 418 exceeds a second predetermined threshold.

The processor 104 includes blending mask determination logic 606, which may be configured to determine a blending mask for the first image frame and the second image frame. For example, the ISP 112 may determine, based on the spotlight within the first image frame 404, a blending mask 420 for the first image frame 404 and the second image frame 406. In certain implementations, the blending mask 420 may be determined based on the spotlight confidence mask 418 such that higher predicted likelihoods 422 within the spotlight confidence mask 418 result in stronger blending weights 424 for corresponding portions of the second image frame 406.

The processor 104 includes image frame blending logic 608, which may be configured to determine a third image frame that blends the first image frame and the second image frame. For example, the ISP 112 may determine a third image frame 408 that blends the first image frame 404 and the second image frame 406 according to the blending mask 420, as explained further above. In particular, the third image frame 408 may be blended to include as least one visual artifact caused by the spotlight within the second image frame 406.

In one or more aspects, techniques for supporting image processing may include additional aspects, such as any single aspect or any combination of aspects described below or in connection with one or more other processes or devices described elsewhere herein. In a first aspect an apparatus is provided that includes a memory storing processor-readable code and at least one processor coupled to the memory. The at least one processor may be configured to execute the processor-readable code to cause the at least one processor to perform operations including receiving a first image frame and a second image frame, wherein the first image frame is captured with a first aperture size and the second image frame is captured with a second aperture size smaller than the first aperture size; determining that a spotlight is depicted within the first image frame; determining, based on the spotlight within the first image frame, a blending mask for the first image frame and the second image frame; and determining a third image frame that blends the first image frame and the second image frame according to the blending mask, wherein the third image frame is blended to include at least one visual artifact caused by the spotlight within the second image frame.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect according to first aspect, determining that the spotlight is depicted within the first image frame includes determining that a brightness value for a collection of pixels within the first image exceeds a first predetermined threshold; determining that a size of the collection of pixels is within a first predetermined range; and determining that the collection of pixels is circular in shape.

In a third aspect according to the second aspect, the operations further include determining a spotlight confidence mask that contains predicted likelihoods that at least a subset of the first image frame contains a spotlight.

In a fourth aspect according to the third aspect, determining that the spotlight is depicted within the first image frame includes determining that at least one predicted likelihood from the spotlight confidence mask exceeds a second predetermined threshold.

In a fifth aspect according to at least one of the third through fourth aspects, the blending mask is determined based on the spotlight confidence mask such that higher predicted likelihoods within the spotlight confidence mask result in stronger blending strengths for corresponding portions of the second image frame.

In a sixth aspect according to the sixth aspect, determining the blending mask further includes smoothing the spotlight confidence mask to gradually increase blending strengths for the second image frame.

In a seventh aspect according to at least one of the first through sixth aspects, the at least one visual artifact is a starburst artifact caused by the spotlight.

In an eighth aspect according to at least one of the first through seventh aspects, the first image frame and second image frame are captured by the same image sensor utilizing different aperture settings.

In a ninth aspect according to at least one of the first through eighth aspects, the second image frame is captured in response to detecting the spotlight within the first image frame.

In a tenth aspect according to at least one of the first through ninth aspects, the apparatus further includes controlling an image sensor to capture the second image frame with the second aperture size in response to detecting the spotlight.

In an eleventh aspect according to at least one of the first through tenth aspects, the first image frame includes a first plurality of image frames, the second image frame includes a second plurality of image frames, or a combination thereof.

In a twelfth aspect, a method is provided that includes receiving a first image frame and a second image frame, wherein the first image frame is captured with a first aperture size and the second image frame is captured with a second aperture size smaller than the first aperture size; determining that a spotlight is depicted within the first image frame; determining, based on the spotlight within the first image frame, a blending mask for the first image frame and the second image frame; and determining a third image frame that blends the first image frame and the second image frame according to the blending mask, wherein the third image frame is blended to include at least one visual artifact caused by the spotlight within the second image frame.

In a thirteenth aspect according to the twelfth aspect, determining that the spotlight is depicted within the first image frame includes determining that a brightness value for a collection of pixels within the first image exceeds a first predetermined threshold; determining that a size of the collection of pixels is within a first predetermined range; and determining that the collection of pixels is circular in shape.

In a fourteenth aspect according to the thirteenth aspect, the method further includes determining a spotlight confidence mask that contains predicted likelihoods that at least a subset of the first image frame contains a spotlight.

In a fifteenth aspect according to the fourteenth aspect, determining that the spotlight is depicted within the first image frame includes determining that at least one predicted likelihood from the spotlight confidence mask exceeds a second predetermined threshold.

In a sixteenth aspect according to at least one of the fourteenth through fifteenth aspects, the blending mask is determined based on the spotlight confidence mask such that higher predicted likelihoods within the spotlight confidence mask result in stronger blending strengths for corresponding portions of the second image frame.

In a seventeenth aspect according to the sixteenth aspect, determining the blending mask further includes smoothing the spotlight confidence mask to gradually increase blending strengths for the second image frame.

In an eighteenth aspect according to at least one of the twelfth through seventeenth aspects, the at least one visual artifact is a starburst artifact caused by the spotlight.

In a nineteenth aspect according to at least one of the twelfth through eighteenth aspects, the first image frame and second image frame are captured by the same image sensor utilizing different aperture settings.

In a twentieth aspect according to at least one of the twelfth through nineteenth aspects, the second image frame is captured in response to detecting the spotlight within the first image frame.

In a twenty-first aspect according to at least one of the twelfth through twentieth aspects, the method further includes controlling an image sensor to capture the second image frame with the small aperture in response to detecting the spotlight.

In a twenty-second aspect according to at least one of the twelfth through twenty-first aspects, the first image frame includes a first plurality of image frames, the second image frame includes a second plurality of image frames, or a combination thereof.

In a twenty-third aspect, an image capture device is provided that includes an image sensor; a memory storing processor-readable code; and at least one processor coupled to the memory and to the image sensor. The at least one processor may be configured to execute the processor-readable code to cause the at least one processor to receive a first image frame and a second image frame, wherein the first image frame is captured with a large aperture and the second image frame is captured with a small aperture; determine that a spotlight is depicted within the first image frame; determine, based on the spotlight within the first image frame, a blending mask for the first image frame and the second image frame; and determine a third image frame that blends the first image frame and the second image frame according to the blending mask, wherein the third image frame is blended to include at least one visual artifact caused by the spotlight within the second image frame.

In a twenty-fourth aspect according to the twenty-third aspect, determining that the spotlight is depicted within the first image frame includes determining that a brightness value for a collection of pixels within the first image exceeds a first predetermined threshold; determining that a size of the collection of pixels is within a first predetermined range; and determining that the collection of pixels is circular in shape.

In a twenty-fifth aspect according to the twenty-fourth aspect, the at least one processor is further configured to determine a spotlight confidence mask that contains predicted likelihoods that at least a subset of the first image frame contains a spotlight.

In a twenty-sixth aspect according to the twenty-fifth aspect, determining that the spotlight is depicted within the first image frame includes determining that at least one predicted likelihood from the spotlight confidence mask exceeds a second predetermined threshold.

In twenty-seventh aspects, the techniques described herein relate to a non-transitory computer-readable medium storing instructions that, when executed by a processor, cause the processor to perform operations including receiving a first image frame and a second image frame, wherein the first image frame is captured with a large aperture and the second image frame is captured with a small aperture; determining that a spotlight is depicted within the first image frame; determining, based on the spotlight within the first image frame, a blending mask for the first image frame and the second image frame; and determining a third image frame that blends the first image frame and the second image frame according to the blending mask, wherein the third image frame is blended to include at least one visual artifact caused by the spotlight within the second image frame.

In a twenty-eighth aspect according to the twenty-seventh aspect, determining that the spotlight is depicted within the first image frame includes determining that a brightness value for a collection of pixels within the first image exceeds a first predetermined threshold; determining that a size of the collection of pixels is within a first predetermined range; and determining that the collection of pixels is circular in shape.

In a twenty-ninth aspect according to the twenty-eighth aspect, the operations further include determining a spotlight confidence mask that contains predicted likelihoods that at least a subset of the first image frame contains a spotlight.

In a thirtieth aspect according to at least one of the twenty-eighth through twenty-ninth aspects, determining that the spotlight is depicted within the first image frame includes determining that at least one predicted likelihood from the spotlight confidence mask exceeds a second predetermined threshold.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 4 and 5 may be combined with one or more blocks (or operations) described with reference to another of the figures. For example, one or more blocks (or operations) of FIG. 5 may be combined with one or more blocks (or operations) of FIGS. 1-4. As another example, one or more blocks associated with FIG. 4 may be combined with one or more blocks (or operations) associated with FIGS. 5-6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes. 1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus, comprising:

a memory storing processor-readable code; and at least one processor coupled to the memory, the at least one processor configured to execute the processor-readable code to cause the at least one processor to perform operations including:

receiving a first image frame and a second image frame, wherein the first image frame is captured with a first aperture size and the second image frame is captured with a second aperture size smaller than the first aperture size;

determining that a spotlight is depicted within the first image frame;

determining, based on the spotlight within the first image frame, a blending mask for the first image frame and the second image frame; and determining a third image frame that blends the first image frame and the second image frame according to the blending mask, wherein the third image frame is blended to include at least one visual artifact caused by the spotlight within the second image frame.

2. The apparatus of claim 1, wherein determining that the spotlight is depicted within the first image frame comprises:

determining that a brightness value for a collection of pixels within the first image exceeds a first predetermined threshold;

determining that a size of the collection of pixels is within a first predetermined range; and determining that the collection of pixels is circular in shape.

3. The apparatus of claim 2, wherein the operations further include determining a spotlight confidence mask that contains predicted likelihoods that at least a subset of the first image frame contains a spotlight.

4. The apparatus of claim 3, wherein determining that the spotlight is depicted within the first image frame comprises determining that at least one predicted likelihood from the spotlight confidence mask exceeds a second predetermined threshold.

5. The apparatus of claim 3, wherein the blending mask is determined based on the spotlight confidence mask such that higher predicted likelihoods within the spotlight confidence mask correspond to stronger blending strengths for corresponding portions of the second image frame.

6. The apparatus of claim 5, wherein determining the blending mask further comprises smoothing the spotlight confidence mask to gradually increase blending strengths for the second image frame.

7. The apparatus of claim 1, wherein the first image frame and second image frame are captured by the same image sensor utilizing different aperture settings.

8. The apparatus of claim 1, wherein the second image frame is captured in response to detecting the spotlight within the first image frame.

9. The apparatus of claim 1, wherein the apparatus further comprises controlling an image sensor to capture the second image frame with the second aperture size in response to detecting the spotlight.

10. A method, comprising:

receiving a first image frame and a second image frame, wherein the first image frame is captured with a first aperture size and the second image frame is captured with a second aperture size smaller than the first aperture size;

determining that a spotlight is depicted within the first image frame;

determining, based on the spotlight within the first image frame, a blending mask for the first image frame and the second image frame; and determining a third image frame that blends the first image frame and the second image frame according to the blending mask, wherein the third image frame is blended to include at least one visual artifact caused by the spotlight within the second image frame.

11. The method of claim 10, wherein determining that the spotlight is depicted within the first image frame comprises:

determining that a brightness value for a collection of pixels within the first image exceeds a first predetermined threshold;

determining that a size of the collection of pixels is within a first predetermined range; and determining that the collection of pixels is circular in shape.

12. The method of claim 11, further comprising determining a spotlight confidence mask that contains predicted likelihoods that at least a subset of the first image frame contains a spotlight.

13. The method of claim 12, wherein determining that the spotlight is depicted within the first image frame comprises determining that at least one predicted likelihood from the spotlight confidence mask exceeds a second predetermined threshold.

14. The method of claim 12, wherein the blending mask is determined based on the spotlight confidence mask such that higher predicted likelihoods within the spotlight confidence mask correspond to stronger blending strengths for corresponding portions of the second image frame.

15. The method of claim 14, wherein determining the blending mask further comprises smoothing the spotlight confidence mask to gradually increase blending strengths for the second image frame.

16. The method of claim 10, wherein the first image frame and second image frame are captured by the same image sensor utilizing different aperture settings.

17. The method of claim 10, wherein the second image frame is captured in response to detecting the spotlight within the first image frame.

18. An image capture device, comprising:

an image sensor;

a memory storing processor-readable code; and at least one processor coupled to the memory and to the image sensor, the at least one processor configured to execute the processor-readable code to cause the at least one processor to:

receive a first image frame and a second image frame, wherein the first image frame is captured with a large aperture and the second image frame is captured with a small aperture;

determine that a spotlight is depicted within the first image frame;

determine, based on the spotlight within the first image frame, a blending mask for the first image frame and the second image frame; and determine a third image frame that blends the first image frame and the second image frame according to the blending mask, wherein the third image frame is blended to include at least one visual artifact caused by the spotlight within the second image frame.

19. The image capture device of claim 18, wherein determining that the spotlight is depicted within the first image frame comprises:

determining that a brightness value for a collection of pixels within the first image exceeds a first predetermined threshold;

determining that a size of the collection of pixels is within a first predetermined range; and determining that the collection of pixels is circular in shape.

20. The image capture device of claim 19, wherein the at least one processor is further configured to determine a spotlight confidence mask that contains predicted likelihoods that at least a subset of the first image frame contains a spotlight, and wherein determining that the spotlight is depicted within the first image frame comprises determining that at least one predicted likelihood from the spotlight confidence mask exceeds a second predetermined threshold.

* * * * *